C. E. McGILL.

SPINDLE RETAINER.

APPLICATION FILED DEC. 6, 1921.

Reissued Jan. 17, 1922. 15,272.

INVENTOR

*Charles E. McGill*

BY *C. E. Beach*

ATTORNEY

UNITED STATES PATENT OFFICE.

CHARLES E. McGILL, OF BINGHAMTON, NEW YORK.

SPINDLE RETAINER.

15,272. Specification of Reissued Letters Patent. Reissued Jan. 17, 1922.

Original No. 1,383,000, dated June 28, 1921, Serial No. 428,597, filed December 6, 1920. Application for reissue filed December 6, 1921. Serial No. 520,441.

*To all whom it may concern:*

Be it known that I, CHARLES E. McGILL, a citizen of the United States, residing at Binghamton, county of Broome, and State of New York, have invented certain new and useful Improvements in Spindle Retainers, of which the following is a specification.

This invention relates to attachments for retaining the spindles of spinning machines, or the like, to prevent them from being lifted from the bolster when removing a bobbin therefrom; and is particularly suited for use in connection with spindles whose bolsters are resiliently held upon their supports.

The objects of this invention are to provide such a retainer which may be securely locked in holding position, which may be readily released and relocked without the use of any tool or implement and by a simple manipulation thereof, which is durable and is inexpensive to manufacture, and which may be readily applied to existing spindles.

Other objects of this invention will be in part obvious and in part more fully described in the following specification and more particularly pointed out in the annexed claims.

This invention will be best understood by reference to the accompanying drawing in which—

Figure 1:
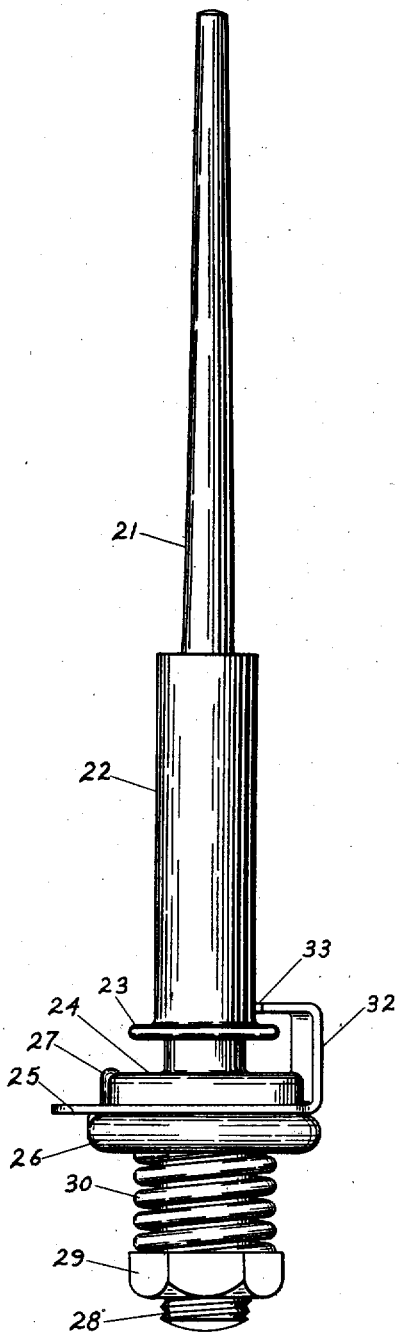
Figure 1 is an elevation of a typical spindle and its supporting structure with this invention applied thereto.
Figure 2:
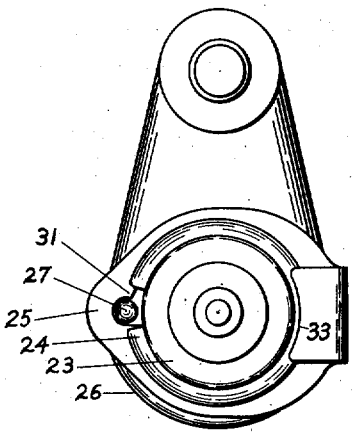
Fig. 2 is a plan view of the parts shown by Fig. 1 showing the retainer in unlocked position.

Referring to Figs. 1 and 2, the spindle 21 carries the pulley 22 having an annular flange 23 at the lower end thereof. Said spindle is journaled to the bolster 24, which bolster rests upon the retainer plate 25. Said plate rests upon the supporting bracket 26 which bracket has an upwardly extending pin 27.

A depending stud 28 extends from the under side of the bolster 24, through an opening provided therefor through the plate 25 and support 26; and the lower end of said stud carries the nut 29, between the upper face of which nut and the under side of the support 26, the spring 30 is so applied as to resiliently draw the bolster 24 toward the support 26. A notch 31 is provided in the bolster 24 for receiving the pin, so that said pin 27 may serve to suitably limit relative rotative movement therebetween.

An upturned projection 32 is carried by the plate 25, the free end 33 of said projection being disposed substantially parallel to the main portion of the plate 25 and spaced slightly above the flange 23, so as to provide a suitable running clearance therefrom. Said end 33 is so formed that it may overlap a suitable portion of the flange 23, and so that, when so overlapping said flange, said end may prevent the spindle 21 from being lifted from the bolster 24.

Figure 3:
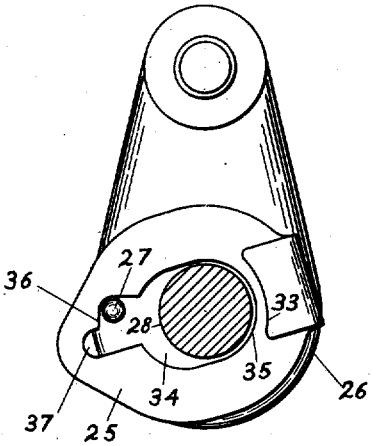
Fig. 3 is a plan view of the supporting bracket and the retainer of Fig. 2, showing the depending stud of the bolster in cross section, the retainer being locked in retaining position.

Referring now more particularly to Fig. 3, it will be seen that the elongated opening 34 is so formed as to receive both the stud 28 and the pin 27; the end 35 of said opening being so positioned with relation to the end 33 of the projection 32 that, when said end 35 rests against the stud 28, such end 33 will overlie the flange 23 and will be separated from the pulley face 22 by a suitable running clearance.

The portion of the opening 34 which is adjacent to the pin 27 comprises the locking ledge 36 and the releasing slot 37. Said ledge being so formed that, when the end 35 rests against the stud 28, as just described, the plate 25 may be rotated around said stud so as to carry the ledge 36 outside of the pin 27, and said plate 25 will be thereby locked against transverse movement thereof; and said slot 37 is so formed that, when the plate 25 is so rotated around the stud 28 as to present said slot to the pin 27, said plate 25 may be moved transversely to an extent sufficient to carry the end 33 out of the path of the flange 23, and will therefor permit the spindle 21 to be lifted off from the bolster 24.

In the use of the embodiment of this invention shown by the drawing the retainer plate 25 is normally positioned as shown in Figs. 1 and 3, said plate being locked against transverse movement by the engagement of the locking ledge 36 with the pin 27, and being further held against movement relatively to the bolster 24 by the frictional engagement of the under side of said bolster with the upper side of said plate. The end 33 is therefore securely retained in such relation to the flange 23 as to prevent the removal of the spindle 21 from the bolster 24, although no part of said retainer plate normally touches any part of said spindle.

If it is desired to remove the spindle 21 from the bolster 24, the plate 25 should be rotated clockwise until the slot 37 is presented to the pin 27, and the plate 25 should thereupon be moved transversely, to the position indicated by Fig. 2, thereby withdrawing the end 33 from the path of the flange 23.

When it is desired to again lock the spindle 21 in position upon the bolster 24, the plate 25 should be moved transversely until the end 35 of the opening 34 rests against the stud 28, and said plate should thereupon be rotated around said stud, in counterclockwise direction until the slot 37 is withdrawn from the pin 27.

It is evident that, should the pin 27 be carried by the bolster 24 (instead of by the bracket 26 as shown), such pin would nevertheless perform its intended functions in an effective manner, and that, should such pin be entirely dispensed with, other features of this invention could nevertheless be advantageously employed, as the friction applied to the opposite sides of the plate 25 by the action of the spring 30 could be relied upon for holding said plate against transverse movement thereof. It is also evident that the functions of the pin 27 might be readily consolidated with those of the stud 28, or that the plate 25 might be placed between the lower face of the support 26 and the upper end of the spring 30, as will be well understood by those skilled in this art.

Various other changes may also be made in the number, form and arrangement of the parts shown without departing from the spirit of this invention; and what I therefore claim and desire to secure by Letters Patent of the United States of America is:

1. The combination of a vertical spindle, a bolster upon which said spindle is journaled, a supporting member for said bolster, and a retainer for said spindle frictionally held between said bolster and said member.

2. The combination of a vertical spindle, a bolster upon which said spindle is journaled, a supporting member for said bolster, a retainer for said spindle frictionally held between said bolster and said member for movement into either an effective or an ineffective position with relation to said spindle, and means other than such frictional engagement for holding said retainer against movement from its effective to its ineffective position.

3. The combination of a vertical spindle, a bolster upon which said spindle is journaled, a retainer for said spindle frictionally secured to said bolster for relative movement around and transversely to the axis of said spindle, and such relative construction and arrangement of parts that said retainer may be moved transversely to an effective or an ineffective position and so that said retainer may be rotated, while in its effective position, so as to permit or prevent transverse movement thereof.

4. The combination with a vertical spindle having an angular flange adjacent to the lower end thereof, a bolster member upon which said spindle is journaled, and a bracket member for supporting said bolster,—of a plate frictionally held between said bolster and said bracket and movable relatively thereto, and an upturned projection carried by said plate, the free end of said projection being adapted to overlap the upper face of said flange.

5. The combination with a vertical spindle having an annular flange adjacent to the lower end thereof, a bolster member upon which said spindle is journaled and a bracket member for supporting said bolster, of a projection carried by one of and extending across the planes of the adjacent faces of said members, a plate frictionally held between said adjacent faces for movement therebetween transversely to the axis of said spindle and so formed that such transverse movement may carry a portion thereof into or out of the path of said flange, and such relative construction and arrangement of said plate and said projection that, while such portion of said plate is in the path of said flange, said plate may be moved either to lock it against or to permit movement to withdraw such portion from said path.

6. The combination of a vertical spindle having a pulley face carrying an annular flange, a bolster member upon which said spindle is journaled, a stud depending from the lower face of said bolster, a retainer plate having an opening therethrough for said stud, said plate being so formed that one portion thereof provides a support for the lower face of said bolster and another portion thereof forms a lug normally disposed adjacent to said pulley face above said flange, a support for said plate having an opening therethrough for said stud, and a spring applied between said stud and the lower side of said support.

7. The combination with a vertical spindle having an annular flange adjacent to the lower end thereof, a bolster member upon which said spindle is journaled, and a bracket member for supporting such bolster, of an upwardly extending projection carried by said bracket in position to engage the said bolster to prevent relative movement therebetween, a retainer for said spindle comprising a plate having a recess therethrough for receiving said projection, said recess being so formed with relation to said projection as to permit movement of said retainer transversely to or concentric with the axis of said spindle, such transverse movement being arranged to govern the effectiveness of said retainer with relation to said spindle and such concentric movement being arranged to afford locking means for governing the transverse movement of said retainer from its effective to its ineffective position.

8. The combination of a vertical spindle having a pulley face carrying an annular flange, a bolster member upon which said spindle is journaled, a supporting bracket member for said bolster having an opening therethrough, a downwardly extending part carried by said bolster member and extending through said bracket member, a spring for urging said members toward one another, a pin carried by said bracket member and so engaging said bolster member as to suitably limit rotative movement thereof with relation to said bracket member, and a plate frictionally held between said members and extending above said flange for limiting the movement thereof away from said bolster, said plate being recessed for said part and said pin so as to permit movement of said plate transversely to said spindle out of the path of the flange and so as to permit rotation of said plate around said recess to a position where it will be locked against such transverse movement.

9. As an article of manufacture, an attachment for retaining a spindle comprising a plate adapted for insertion between a bolster and the support provided therefor, said plate having an elongated opening therethrough for a stud extending from such a bolster and having an extension for limiting movement of the spindle away from such bolster.

10. As an article of manufacture, an attachment for retaining a spindle comprising a plate adapted for insertion between a bolster and the support provided therefor, said plate having an elongated opening therethrough for a stud and for a pin extending from such a bolster, and having an extension for limiting movement of the spindle away from such a bolster, said opening being so formed as to permit transverse movement of said plate as to effect release of the spindle when said plate is in a certain position with relation to such pin and to prevent such transverse movement when said plate is not in such relative position.

11. The combination with a supporting member, a bolster member carried by said supporting member, adapted to form a journal for a suitable spindle and comprising fastening means for resiliently urging said members toward one another,—of a retainer plate so formed and arranged as to be adapted, when in one position, to suitably restrain movement of such a spindle away from said bolster member and to be frictionally held through the action of said means against movement away from such position.

12. The combination with a vertical spindle, a bolster upon which said spindle is journaled and a supporting member for said bolster,—of a retainer for said spindle arranged for movement into either an effective or an ineffective position with relation to said spindle, and securing means serving both for maintaining intended relationship between said bolster and said supporting member and for frictionally restraining movement of said retainer.

13. The combination with a vertical spindle carrying an annular flange, a bolster member upon which said spindle is journaled, a stud depending from the lower face of said bolster, and a support for said bolster having an opening therethrough for said stud,—of a retainer for said spindle comprising a plate engaging such support and arranged for movement relative thereto into either effective or ineffective relationship with said flange, and a spring secured to said stud and so applied as to frictionally restrain such relative movement.

14. The combination with a vertical spindle carrying an annular flange, a bolster member upon which said spindle is journaled, a stud depending from the lower face of said bolster and a support for said bolster having an opening therethrough for said stud,—of a retainer plate having an opening therethrough for said stud, said plate being so formed that one portion thereof is normally disposed adjacent to said spindle above said flange and so that another portion thereof engages a face of said support adjacent to said stud and so as to permit movement of said plate relative to said stud in a plane substantially perpendicular to the axis thereof such as to carry the first named portion of said plate into or out of the path of said flange, and a spring applied between the lower side of said support and said stud in such manner as to frictionally restrain relative movement between said plate and said support.

15. The combination with a vertical spindle carrying an annular flange, a bolster member upon which said spindle is journaled, a stud depending from the lower face of said bolster and a support for said bolster having an opening therethrough for said stud,—of a retainer plate having an opening therethrough for said stud, said plate being so formed that one portion thereof is normally disposed adjacent to said spindle above said flange and another portion thereof engages a face of said support adjacent to said stud and so as to permit movement of said plate relative to said stud in a plane substantially perpendicular to the axis thereof such as to carry the first named portion of said plate into or out of the path of said flange, and a spring so applied between said stud and said support as to frictionally restrain relative movement between said plate and said support.

16. The combination with a vertical spindle, a bolster upon which said spindle is journaled and a supporting member for said bolster,—of a retainer for said spindle arranged for movement into either an effective or an ineffective position with relation to said spindle, securing means serving both for maintaining intended relationship between said bolster and said supporting member and for frictionally restraining movement of said retainer, and means other than said securing means for holding said retainer against movement from its effective to its ineffective position.

17. The combination with a vertical spindle carrying an annular flange adjacent to the lower end thereof, a bolster member upon which said spindle is journaled, a bracket member for supporting said bolster and a projection carried by one of and extending across the planes of the adjacent faces of said members,—of a plate held in frictional engagement with a face of one of said members for movement thereupon transversely to the axis of said spindle and so formed that such transverse movement may carry a portion thereof into or out of the path of said flange, and relative construction and arrangement of said plate and such projection whereby movement of said plate to withdraw such portion from said path may be suitably restrained.

18. The combination with a vertical spindle carrying an annular flange, a bolster upon which said spindle is journaled, a supporting member for said bolster member and means comprising a spring applied for urging said members toward one another,—of a retainer plate so formed that a portion thereof is normally disposed adjacent to said spindle above said flange and that another portion thereof engages one of said members for movement relatively thereto such as to carry said first named portion into or out of the path of said flange, and such relative construction and arrangement of said plate, members and means that the urging of said means will frictionally restrain such movement of said retainer plate.

19. The combination with a spindle, a bolster member comprising a journal for said spindle, a supporting member for said bolster member and means comprising a spring applied for urging said members toward one another,—of a retainer plate so formed that, when in one position, it will serve to suitably restrain movement of said spindle away from said bolster member and so that, when in another position, said plate will not so restrain such movement, and relative construction and arrangement of said plate, members and means whereby movement of said plate from one to the other of the aforesaid positions thereof is permitted and whereby the urging of said means will serve to frictionally restrain such movement of said plate.

20. The combination with a spindle, a bolster member comprising a journal for said spindle, a supporting member for said bolster member and means comprising a spring applied for urging said members toward one another,—of a retainer plate so formed that, when in one position, it will serve to suitably restrain movement of said spindle away from said bolster member and so that, when in another position, said plate will not so restrain such movement, and relative construction and arrangement of said plate, members and means whereby movement of said plate from one to the other of the aforesaid positions thereof is permitted, whereby movement of said plate from the first to the second named positions thereof may be suitably restrained and whereby the urging of said means will serve to frictionally restrain such movement of said plate.

21. As an article of manufacture, an attachment for retaining a spindle in proper relation to the bolster member and the supporting member provided therefor, said attachment comprising a plate so constructed and arranged as to be adapted to be held in frictional engagement with one of said members by the means provided for securing said members one to the other and having an extension for limiting movement of the spindle away from such bolster member.

22. As an article of manufacture, an attachment for retaining a spindle in proper relation to the bolster and support provided therefor, said attachment comprising a plate adapted for engaging a surface of said support for movement thereon to either an effective or an ineffective position and to be held in frictional engagement with such surface by the means provided for securing such bolster in position upon such support, said plate having an elongated opening therethrough for a stud extending from such a bolster, the walls of said opening having a projection formed therein for restraining movement of said projection from one to the other of the positions thereof.

23. As an article of manufacture, an attachment for retaining a spindle in proper relation to the bolster and support provided therefor, said attachment comprising a plate adapted for engaging a surface of said support for movement thereon to either an effective or an ineffective position and to be held in frictional engagement with such surface by the means provided for securing such bolster in position upon such support.

In witness whereof, I hereunto subscribe my name, this 28 day of November, 1921.

CHARLES E. McGILL.